United States Patent
d'Auria et al.

[11] 4,229,071
[45] Oct. 21, 1980

[54] ELECTRO-OPTICAL SWITCHING APPARATUS

[75] Inventors: Luigi d'Auria; Jean-Pierre Huignard, both of Paris, France

[73] Assignee: Thomson-CSF, Paris, France

[21] Appl. No.: 889,905

[22] Filed: Mar. 24, 1978

[30] Foreign Application Priority Data

Mar. 25, 1977 [FR] France .................... 77 09001

[51] Int. Cl.³ .................... G02F 1/03; G02B 27/10
[52] U.S. Cl. .................... 350/150; 250/578; 350/169
[58] Field of Search .............. 350/150, 333, 342, 169; 358/61, 212; 250/578

[56] References Cited

U.S. PATENT DOCUMENTS

| | | | |
|---|---|---|---|
| 2,176,136 | 10/1939 | Hoyt | 358/212 |
| 2,905,068 | 9/1959 | Friedman | 350/272 |
| 3,644,017 | 2/1972 | Ploss | 350/150 |
| 3,701,121 | 10/1972 | Fraser | 350/150 |
| 3,868,655 | 2/1975 | Filippazzi | 350/150 |

OTHER PUBLICATIONS d'Auria, L. "Fast-Access Optical R.O.M. Addressed by an L.E.D. Matrix", First European Electro-Optics Markets & Technology Conference, Geneva 13/15, 1972.
Tecnology, "Fiber Display Features Digital Scanning", Optical Spectra, 6-1974, pp. 44.
Wajda, E. S., "Optical Scanner", IBM. Tech. Disclosure Bulletin, vol. 15, #7, 12-1972, pp. 2281.

*Primary Examiner*—John K. Corbin
*Assistant Examiner*—Wm. H. Punter
*Attorney, Agent, or Firm*—Cushman, Darby & Cushman

[57] ABSTRACT

An electro-optical switching apparatus which comprises at least an input photo-emitter circuit which lights up a switching matrix comprising a plurality of switching elements selected with two pluralities of crossed connections. Under the control of switching signals one of these elements turns on and allows the light to pass through. An image of this switching matrix is formed by a lens onto a matrix of photo-receiver circuits and the light transmitted through the turned on switching element induces in one of said photo-receiver circuits a transmitted switched signal.

9 Claims, 5 Drawing Figures

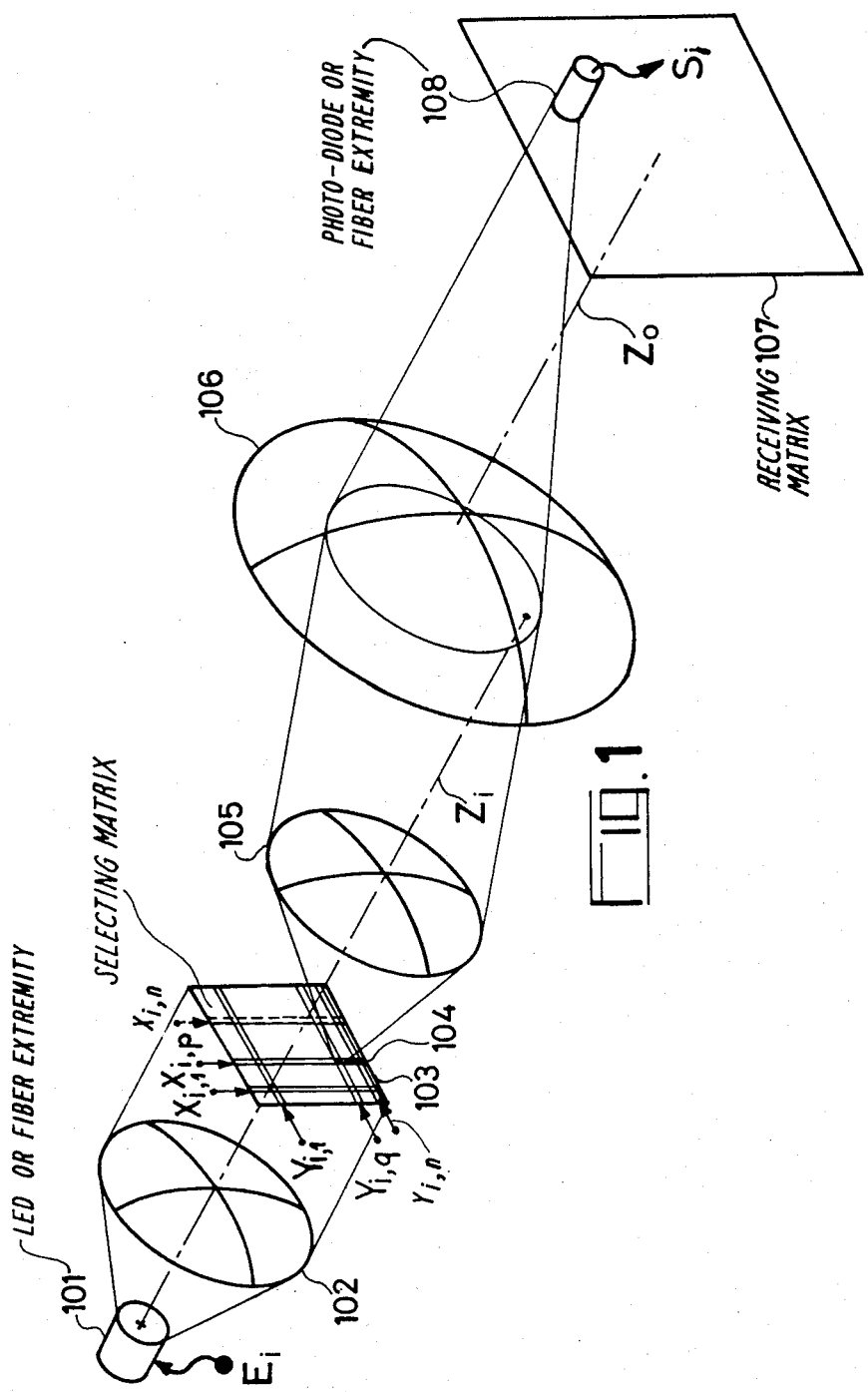

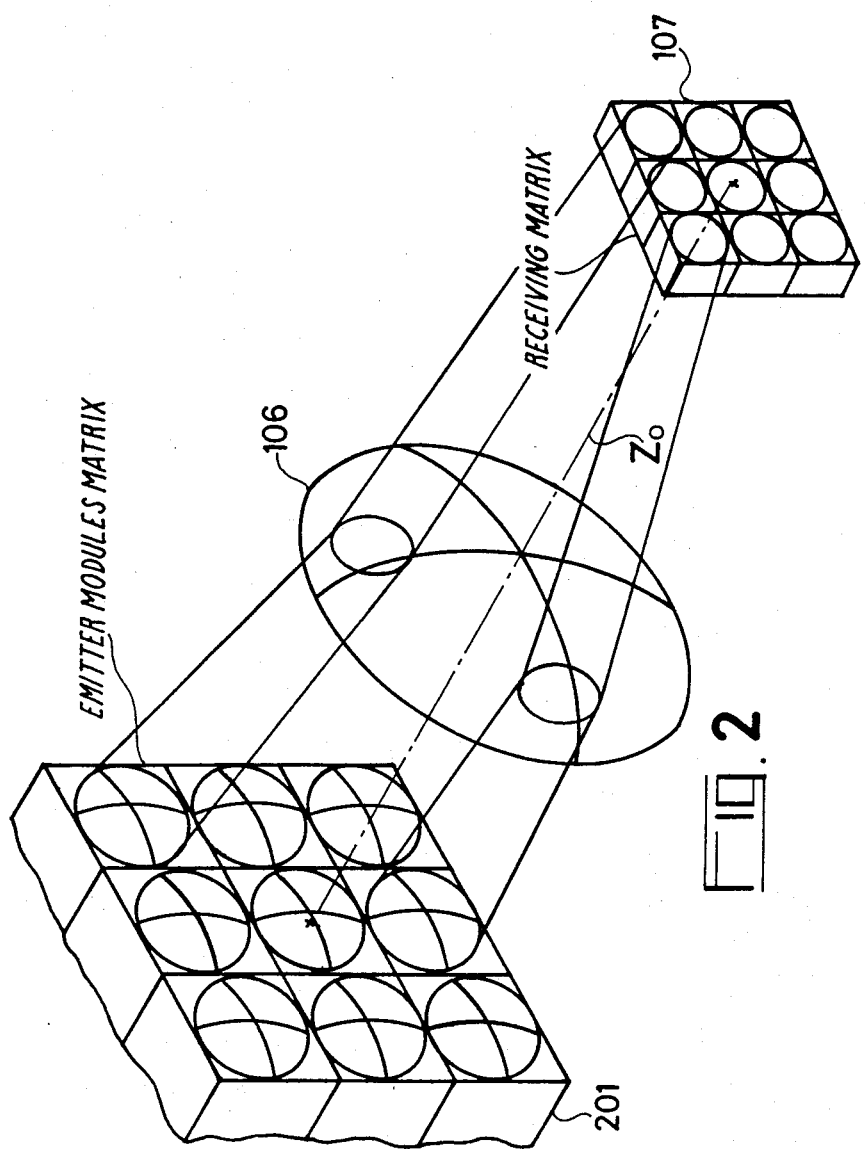

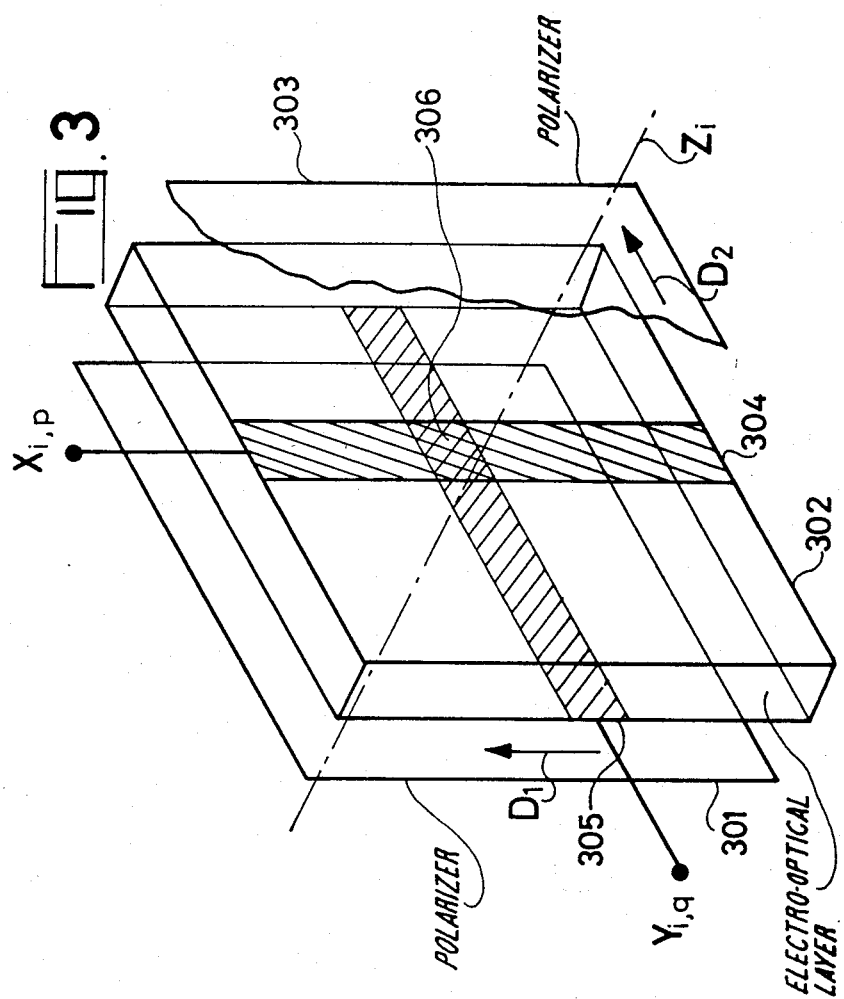

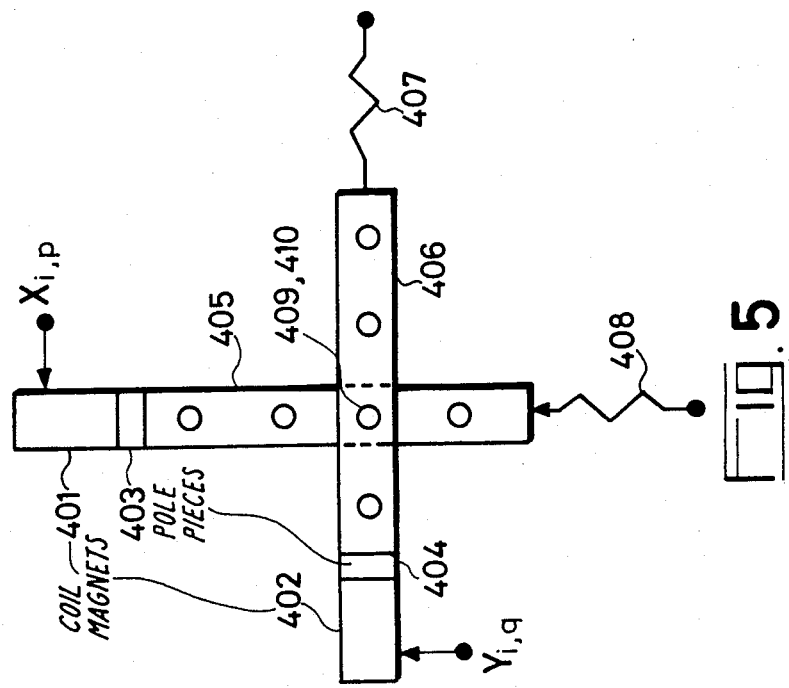
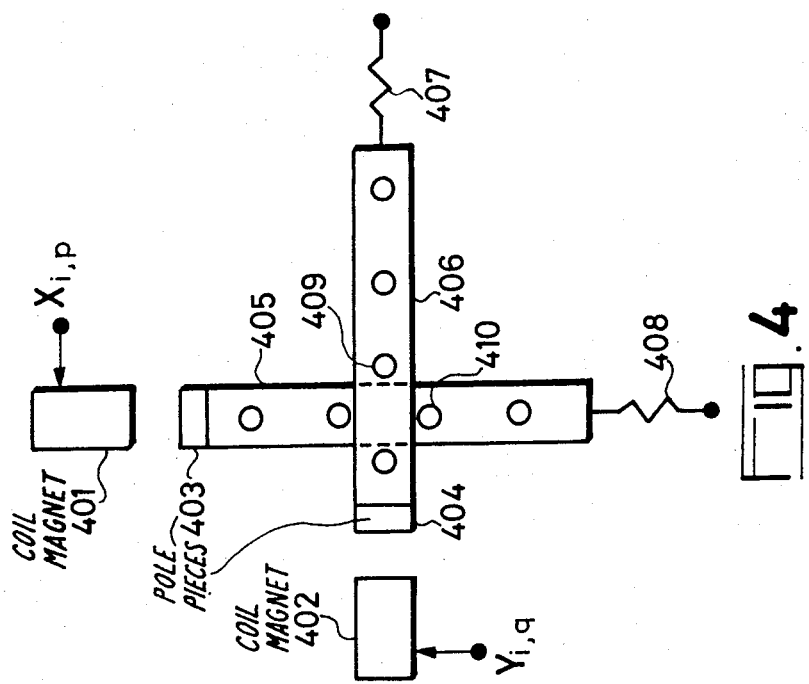

ELECTRO-OPTICAL SWITCHING APPARATUS

The present invention relates to electro-optical switching devices for connecting input circuits to output circuits through optical connections which may be modified under the action of external electric control signals.

Such devices are particularly useful in exchange where they may advantageously replace the electro-mechanical switches permitting the interconnection of subscribers. The main drawback of the electro-mechanical switches is to include moving contacts which become worn and soiled and consequently require a long and costly maintenance.

It is known to construct a random access memory by illuminating with photo-emitting diodes a plane of data constituted by a matrix of opaque or transparent points and by forming the image of these points on photo-receiving diodes. This memory is described in an article (1) published by the inventors of the present invention in "Proceedings of the First European Electro-Optics Markets and Technology Conference", Geneva September 13-15 1972 and entitled "Fastaccess optical R.O.M. addressed by an L.E.D. matrix".

In accordance with the present invention, there is provided an apparatus for optically connecting at least one photo-emitter circuit to at least one circuit of a plurality of photo-receiver circuits disposed as a receiving matrix, which comprises:

at least one plurality of selecting means for receiving and selectively transmitting the light emitted by said photo-emitter circuit; the number of said selecting means being equal to the number of said photo-receiver circuits, and said selecting means being disposed as a selecting matrix; said selecting matrix having two pluralities of connections for adressing each of said selecting means; and each of said selecting means being capable to transmit said light under the control of external switching signals directed onto said connections; and means for projecting an image of said plurality of selecting means onto said plurality of photo-receiver circuits, and focussing the light transmitted by said selecting means onto respectively said photo-receiver circuits.

For a better understanding of the invention, and to show how the same may be carried into effect, reference will be made to the ensuing description and to the attached figures among which:

FIG. 1 illustrates a partial diagram of an electro-optical switching device,

FIG. 2 illustrates a diagrammatic view of a complete device,

FIG. 3 illustrates a diagram of an embodiment of a selecting means;

FIGS. 4 and 5 illustrates partial views of another embodiment of a selecting means illustrated in open and shut states.

The partial view of a switching device in FIG. 1 has been limited on the emitting side to a single circuit i and the selecting device associated therewith.

The signals to be transmitted are applied by way of the input connection $E_i$ to a light source or photo-emitter circuit 101, e.g. a LED. The light emitted by this source, which is preferably monochromatic in order to simplify the construction of the lenses used in the device, is received by a condenser 102 whereby it is possible to illuminate in a substantially uniform manner a selecting matrix 103. This matrix, made with an electro-optical material, comprises $n^2$ elements which are capable of being rendered opaque or transparent under the control of external signals applied to two pluralities of n connections defining a matrix addressing of these $n^2$ elements. In the Fig., only a part of the connections $X_{i,1}$ to $X_{i,n}$ and $Y_{i,1}$ to $Y_{i,n}$ has been illustrated. Each of these connections supplies a transparent conductive band which is vertical for the Xs and horizontal for the Ys. By applying a voltage equal to one half of the control voltage to a connection X and to a connection Y, namely $X_{i,p}$ and $Y_{i,p}$ for example in the Fig., the crossing point of these bands is turned to be transparent, which defines on the dark background of the matrix a luminous element such as 104, shown in black for the needs of the drawing.

A lens 105 forms an image at infinite distance of the matrix 103 and therefore of the luminous element 104. This lens, the matrix 103, the condenser 102 and the source 101 are all aligned on an axis $Z_i$ specific to the common elements of the input circuit i.

An objective 106 common to all the input circuits and having an axis $Z_o$ distinct from but parallel to $Z_i$ takes up the luminous beam issuing from the lens 105 and forms an image of the luminous element 104 on a matrix 107 of photo-receiver circuits (namely photo-diodes) which is located in its focal plane. The photo-diodes are located at the image points of the different elements of the matrix 103 produced by the optical system 105-106. There are therefore $n^2$ photo-diodes and there has been shown in the Fig. only the photo-diode 108 located at the image point of the element 104. This photo-diode, excited by the radiation received, produces a signal at the output connection $S_j$. This signal is identical, taking into account a scale factor, noise and distortion, to the signal received at the connection $E_i$.

By selecting another luminous element on the matrix 103 with another set of connections $X_i$-$Y_i$ there will be produced at another output connection S the signal received at the input connection $E_i$. There is thus obtained an electro-optical switch permitting the connection of the circuit connected to the input diode to a circuit connected to one of the output diodes. If need be (distribution of a ringing tone to several subscribers for example), this input may even be connected to several output diodes.

Such a switch may be employed alone and would then perform the same function as, for example, a rotary switch such as those used in old exchangers.

But, it is preferable to employ a composite switch which would then perform the same function as the present crossbar switches used in modern exchanges.

For this purpose, a given number of modules may be assembled, each comprising a LED or fiber optic extremity such as 101, a condenser such as 102, a selecting matrix such as 103, and a lens such as 105.

These modules are illustrated in FIG. 2 by a series of rectangular members stacked in accordance with a matrix 201, the circles on the front faces representing the output lenses of these modules and forming in this embodiment a 3×3 matrix. The axes $Z_i$ of the modules are, as in FIG. 1, parallel to the axis $Z_o$. Each module corresponds to an input circuit $E_i$, not shown in the Fig. and is provided with two connection pluralities which are not shown and permit the selection of a luminous beam issuing at a variable angle from the output lens of the module.

The objective 106 collects all the luminous beams issuing from the matrix 201 and focuses them on the matrix 107 of photo-diodes. These photo-diodes are represented by their rear face, symbolically represented by a circle placed in the squared pattern of the matrix 107. Each thereof is provided with an output circuit Sj not shown in the Fig.

In the usual case where it is desired to obtain the maximum density of individual interconnections, there is employed a device comprising as many input circuits $E_i$ as there are output circuits $S_j$, namely $n^2$. There will consequently be $n^2$ modules each provided with two pluralities of n connections for selecting optical circuits inside the device. In order to achieve maximum compactness of the device, the modules and the output photo-diodes are then disposed in accordance with a square matrix of the order n. This arrangement corresponds to the embodiment shown in FIG. 2 in which $n=3$. Thus by applying a set of signals suitably chosen on the selecting connections of the modules, it will be possible to connect each input circuit to one of the output circuits and consequently achieve $n^2$ internal optical connections in the device. These signals may be mere logic signals and the conditions of exclusion, required to avoid connecting for example the same output circuit to several input circuits, will be achieved in the external control equipment by means of known analyzing logic devices.

In special cases different numbers of inputs and outputs may be used.

FIG. 3 illustrates an embodiment of the selecting matrix 103 comprising, perpendicular to the axis $Z_i$, a layer of electro-optical material 302, e.g. gadolinium molybdate, sandwiched between two crossed polarizers 301 and 303, the polarizer 303 being shown partly.

The light propagated in the direction of the axis $Z_i$ first travels through the polarizer 301 which is directed in the direction $D_1$, then the layer 302 which is active only under the action of an electric field and lastly the polarizer 303 directed in direction $D_2$. In the regions where the layer 302 is not active, the action of the crossed polarizers prevents this light from passing through.

The faces of the layer 302 support electrodes in the form of bands which are parallel on the same face and crossed between the faces. Only two of these electrodes 304 and 305 have been shown in the Fig. and are connected to the input connections $X_{i,p}$ and $Y_{i,q}$. By applying a voltage between these connections $X_{i,p}$ and $Y_{i,q}$ there is produced at the crossing point 306 between the bands an electric field which is parallel to $Z_i$ and locally modifies the optical properties of the material of the layer 302. In respect of gadolinium molybdate and a thickness of about 400 μm, the plane of polarization of the light travelling through the layer turns through 90° under the action of a voltage of between 150 and 300 V, depending on the quality of the material employed. This voltage, although high, may be supplied by a circuit employing presently available transistors.

The electrodes are transparent with respect to the light employed and e.g. made with zinc oxide vacuum evaporated under. Consequently, the polarized light furnished by the polarizer 301 has its polarization plane turned so that it becomes parallel to the direction of the polarizer 303 which therefore no longer stops it at this point. Consequently, there is obtained at the crossing point of the active electrodes a luminous point whose dimensions and shape are not very definable since the electric field does not decrease instantaneously outside the crossing and its distribution is rather intricate. These dimensions are of the order of 100 to 200 μm but they determine the filling rate η which may be measured experimentally and is about 0.5.

An important factor is the contrast between the transparent parts and the non transparent parts. A contrast of $C=10^3$ is obtained without difficulty.

The condensers and the lenses may be formed by molding a plastics material since they do not require very high optical qualities and operate in monochromatic light. An interesting modification resides in the use of holographic lenses constructed in accordance with the process explained in reference (1).

The signal/noise ratio in the area of the receiving photodiodes is essentially determined by the parasitic light due to the non infinite contrast of the selecting matrix. Consequently, a photo-diode receives the useful light coming from the circuit to which $E_i$ is connected and a fraction 1/C of the light given out by the $n^2-1$ other circuits to which this photo-diode must not be connected.

The parasitic power $P_p$ thus received is therefore in the worst case equal to, if $P_R$ is the useful optical power received by the photo-diode:

$$P_p = (n^2 - 1) \frac{P_R}{C}$$

And the signal/noise ratio is therefore equal to:

$$\frac{P_R}{P_p} = \frac{C}{n^2 - 1}$$

In the case, very useful in telephone systems, of a $12 \times 12$ matrix, for a contrast of $10^3$, this ratio is equal to:

$$\frac{P_R}{P_p} = \frac{10^3}{14^3} \simeq 7$$

Such a result is poor for an analog transmission but perfectly well allows a digital transmission.

It is also possible to calculate the value of the useful optical power received. If T is the transmission rate of the optical system, η the smallest of the filling rates of the selecting matrix or of the photo-diode matrix, $P_i$ the optical power received by the selection matrix, this power is given by:

$$P_R = P_i \times T \times \frac{1}{n^2} \times \eta$$

The following practical figures have been obtained:
$P_i = 1.25$ mW for a Lambert source of 5 mW and a condenser having a numerical aperture of 0.5.
$T = 10\%$
$\eta = 0.5$
$n^2 = 144$ for the $12 \times 12$ matrix seen above.
Under these conditions:

$$P_r = 1.25 \times 0.1 \times \frac{1}{144} \times 0.5 = 434 \, nW$$

Bearing in mind the signal/noise ratio calculated above, each connection may thus support several hundreds of telephonic channels.

The selecting matrix made with electro-optical material allows having short switching times, of the order of a few milliseconds, but on the other hand provides a contrast that is not very strong and consequently limits the signal/noise ratio in the receiver circuits.

An electromechanical selection matrix may then be employed comprising two pluralities of strips which are parallel to each other in the same plurality of crossed from one plurality to the other. These strips are opaque and have apertures which are unmasked when the strips are actuated and embody in this way the selection elements.

FIGS. 4 and 5 illustrates two of these strips 405 and 406 which are at rest in FIG. 4 and are actuated in FIG. 5. Control electromagnets 401 and 402 are connected to the connections $X_{i,p}$ and $Y_{i,q}$ and may thus receive the selection signals. They are able, under the action of these signals, to attract the pole pieces 403 and 404 located at one end of the strips 405 and 406. When these signals cease, return springs 407 and 408, fastened to the other end of the strips, bias them to their rest position.

Apertures, such as 409 and 410, with which the strips are provided are spaced sufficiently apart to ensure that the light cannot pass through at the intersection of the strips when the electromagnets are not actuated (FIG. 4). Under the action of these electromagnets, the strips move in such manner that there are obtained at their intersection two superimposed apertures (FIG. 5) which form a luminous patch the image of which will be formed on the diode corresponding to the output circuit thus selected. The contrast thus obtained is quasi-infinite but the rapidity is low.

Another embodiment comprises replacing the LED by the ends of optic fibers supplied with data from elsewhere and the photo-receivers diodes by the ends of optic fibers which are thus excited directly by the switch. Other embodiments comprise mixed assemblies, emitter fiber receiver diode or vice versa.

What we claim is:

1. Optical switching apparatus for optically coupling at least one photo-emitter circuit of a plurality of such photo-emitter circuits disposed as an emitting matrix to at least one circuit of a plurality of photo-receiver circuits disposed as a receiving matrix, comprising:
    a plurality of individually and simultaneously addressable photo-emitter circuits;
    a plurality of selecting matrices, one such selecting matrix associated with each photo-emitter circuit, for receiving and selectively transmitting, respectively, light emitted by the photo-emitter circuit associated therewith, each of said selecting matrices including:
    a first polarizer for polarizing light received by said matrix,
    a layer of electro-optical material for transmitting light polarized by said first polarizer, said layer having first and second faces,
    a first plurality of transparent strip electrodes parallel to each other and disposed on said first face,
    a second plurality of transparent strip electrodes parallel to each other but crossed with reference to said first plurality of electrodes said second plurality of electrodes being disposed on said second face and defining with said first plurality of electrodes a plurality of crossing points whereat the polarization of light transmitted by said layer can be locally rotated by selective activation of electrodes among said first and second pluralities, and
    a second polarizer having a direction of polarization that is crossed with respect to the direction of polarization of said first polarizer for selecting light transmitted by said layer at crossing points whereat the polarization of said transmitted light is rotated;
    a plurality of photo-receiver circuit matrices, each such matrix associated with a particular one of said photo-emitter circuits and a particular one of said selecting matrices, each such photo-receiver circuit matrix including a plurality of photo-receiver circuits; and
    means for forming images of said selecting matrices onto said plurality of photo-receiver circuits, so that light transmitted by each crossing point of one selecting matrix energizes one of said photo-receiving circuits, whereby light from any addressed photo-emitter circuit can be coupled to any photo-receiver circuit within the array of photo-receiver circuits associated therewith by energizing a selected cross point of the selecting matrix associated therewith.

2. An apparatus as claimed in claim 1, further comprising a condenser for directing light emitted by said photo-emitter circuit onto said first polarizer.

3. An apparatus as claimed in claim 2, wherein said photo-emitter circuit is a light-emitting diode.

4. An apparatus as claimed in claim 2, wherein said photo-emitter circuit is an optical fiber.

5. An apparatus as claimed in claim 3, wherein said photo-receiver circuits are photo-diodes.

6. An apparatus as claimed in claim 4, wherein said photo-receiver circuits are optical fibers.

7. Apparatus according to claim 5, wherein the number of photo-emitter circuits in said plurality of photo-emitter circuits, the number of selecting matrices in said plurality of selecting matrices and the number of photo-receiver circuit matrices in said plurality of photo-receiver circuit matrices are equal.

8. Apparatus according to claim 7, wherein said means for forming images of said selecting matrices comprises:
    a plurality of lenses for respectively collecting light transmitted by said selecting matrices; and
    a projecting lens for focusing onto said plurality of photo-receiver-circuits light collected by said lenses.

9. Apparatus according to claim 8, wherein the lenses of said plurality of lenses are holographic lenses.

* * * * *